US012094312B2

(12) United States Patent
Glover et al.

(10) Patent No.: US 12,094,312 B2
(45) Date of Patent: Sep. 17, 2024

(54) SYSTEM AND METHOD FOR MANAGING A CRISIS SITUATION

(71) Applicant: Guardian-I, Cartersville, GA (US)

(72) Inventors: Samuel Graham Glover, Menlo, GA (US); Stephen Sherer Mauney, Cartersville, GA (US)

(73) Assignee: GUARDIAN-I, LLC, Cartersville, GA (US)

(*) Notice: Subject to any disclaimer, the term of this patent is extended or adjusted under 35 U.S.C. 154(b) by 0 days.

(21) Appl. No.: 17/814,469

(22) Filed: Jul. 22, 2022

(65) Prior Publication Data

US 2024/0029534 A1 Jan. 25, 2024

(51) Int. Cl.
*G08B 21/02* (2006.01)
*G08B 21/18* (2006.01)

(52) U.S. Cl.
CPC ........... *G08B 21/02* (2013.01); *G08B 21/182* (2013.01)

(58) Field of Classification Search
CPC .............................. G08B 21/02; G08B 21/182
USPC ....................................................... 340/573.1
See application file for complete search history.

(56) References Cited

U.S. PATENT DOCUMENTS 8,942,676 B2 * 1/2015 Dalton ................... G16H 40/67 600/300
9,818,279 B2 * 11/2017 Bernhardt .............. G08B 21/10
10,631,760 B2 * 4/2020 Dracup ................ A61B 5/4094
11,276,289 B1 * 3/2022 Madden ............... G08B 21/182
2006/0282021 A1 * 12/2006 DeVaul ................ A61B 5/0205 600/595
2013/0060167 A1 * 3/2013 Dracup .................. G16H 80/00 600/595
2014/0278475 A1 * 9/2014 Tran ....................... G16H 20/30 705/2

(Continued)

FOREIGN PATENT DOCUMENTS

CN 107644509 A 1/2018
CN 110072022 A 7/2019

OTHER PUBLICATIONS

PTI, "Smart bracelet can sense danger, call for help","The Hindu", Our code of editorial values, Apr. 15, 2018, Washington, US Link—https://www.thehindu.com/sci-tech/technology/smart-bracelet-can-sense-danger-call-for-help/article23546825.ece.

*Primary Examiner* — Zhen Y Wu
(74) *Attorney, Agent, or Firm* — Briggs IP; Jeremy A. Briggs

(57) ABSTRACT

A method, performed by a user device, to manage a crisis situation of a user is provided. The method includes obtaining a profile of the user and a real-time location of the user. The method further includes obtaining a plurality of measurements associated with the user from a plurality of measurement units of the user device. Furthermore, the method includes determining whether one or more of the plurality of measurements exceed respective first predefined threshold values. When the one or more measurements exceed the respective first predefined threshold values, the method includes calculating a probability of the crisis situation. Responsive to calculating the probability, the method includes determining a type of the crisis situation. Additionally, the method includes actuating one or more mitigation steps, based on the probability, the type of the crisis situation, and the real-time location of the user.

20 Claims, 5 Drawing Sheets

(56) References Cited

U.S. PATENT DOCUMENTS

2014/0327540 A1* 11/2014 Shin .................. G08B 21/0446
340/539.11
2015/0206418 A1* 7/2015 Hoffman ................ G08B 21/02
340/539.13
2016/0220169 A1* 8/2016 Girouard .............. A61B 5/4094
2017/0140629 A1* 5/2017 Briggs ............... G08B 21/0453
2019/0057189 A1 2/2019 Frederickson et al.
2019/0088101 A1* 3/2019 Tunnell .................. G08B 21/02
2019/0206230 A1 7/2019 Musumano
2019/0355229 A1* 11/2019 Chavez .................... G08B 1/08
2020/0320851 A1 10/2020 Deutsch
2021/0052170 A1 2/2021 Stewart
2021/0287522 A1 9/2021 Benoit et al.
2021/0314758 A1* 10/2021 Newman ................. H04L 43/10
2021/0327242 A1* 10/2021 Uesu .................... G08B 21/182

* cited by examiner

SYSTEM AND METHOD FOR MANAGING A CRISIS SITUATION

TECHNICAL FIELD

The present disclosure relates to a system and method for managing a crisis situation, and more specifically to monitoring the crisis situation of a user, and actuating mitigation steps based on the type of the crisis situation.

BACKGROUND

People often face emergency or crisis situations in their daily lives. These situations range from falling down, drowning, to being assaulted or threatened. A person is typically not in a situation to respond to these situations on time, as he may be incapacitated or too scared to respond.

For example, if a person is held at gunpoint, he is unlikely to make a call to the police himself. Similarly, the person may be in an assault situation, in which he may focus on ways to come out of the situation, rather than make an emergency call or notify his neighbors for help. Likewise, the person may be in a medical emergency (such as, having a heart attack) and may not be able to call for medical assistance such as an ambulance, or call for help from his friends or family. Similarly, if an elderly person falls, they may be unable to call a caretaker or family for help.

A delay in responding to crisis situations can have serious consequences that may include injury, loss of valuables, or at times, even loss of life. Several conventional approaches are used to monitor an emergency situation or personal crisis. For example, closed circuit television (CCTV) cameras are sometimes used to monitor vulnerable people or locations. In addition, most modern mobile phones have provision to call emergency numbers easily.

However, these approaches have limitations and cannot deal with different types of crisis situations, especially when the crisis occurs outdoors and the person is incapacitated, scared, or otherwise prevented from emergency calls in a duress situation.

Thus, there is a need for a system and method to accurately monitor crisis situations and to actuate mitigation measures.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
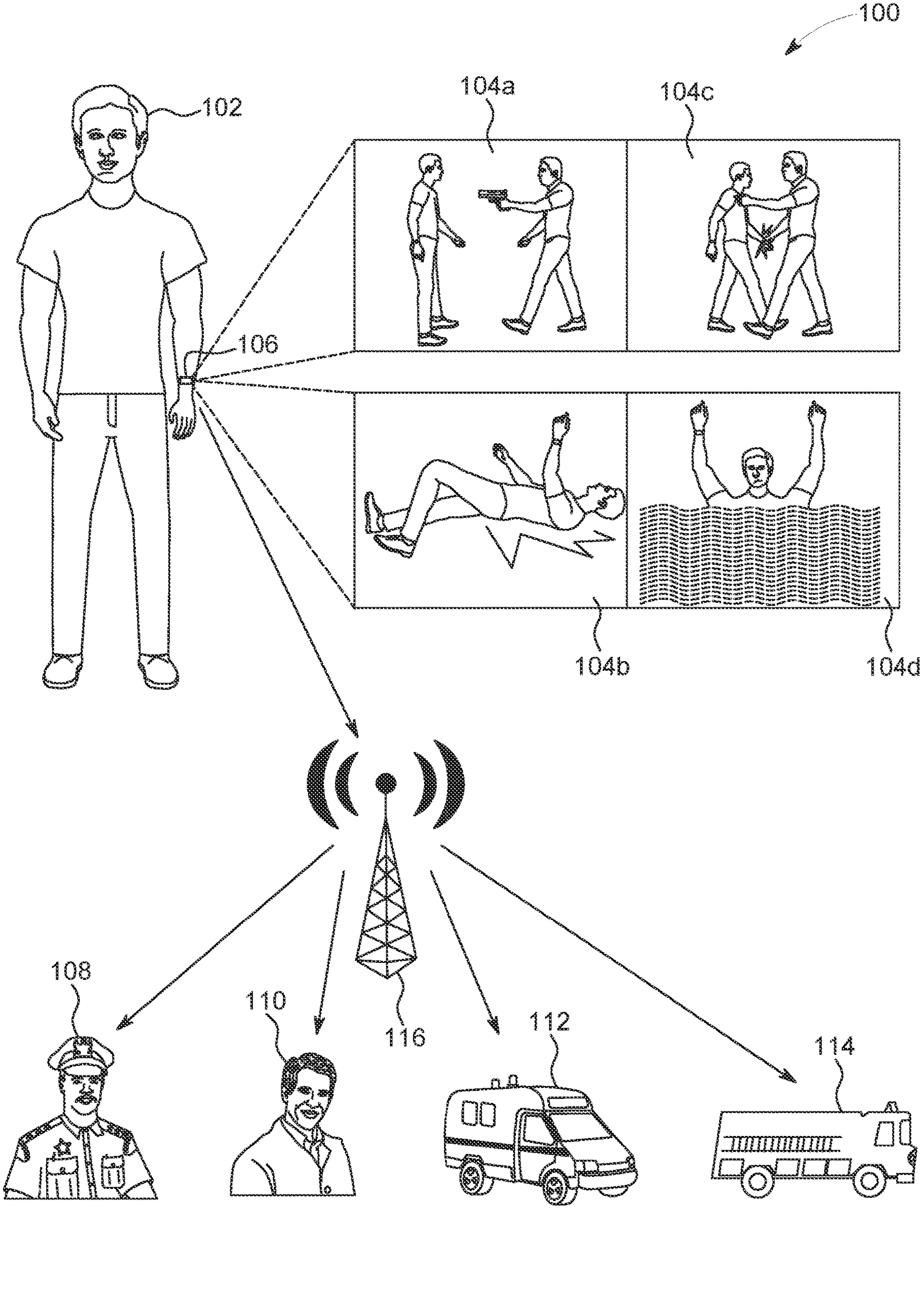
FIG. 1 depicts an environment in which techniques and structures for providing the systems and methods disclosed herein may be implemented.

The present disclosure is directed towards a user device for managing a crisis or an emergency situation of a user. The user device may be a wearable device, for example, a smart watch, a smart bracelet, a smart ring, and the like. The user device may be configured to determine a probability and a type of the crisis situation of the user, and correspondingly actuate one or more mitigation steps to assist the user. In some aspects, the mitigation steps may be customized or scaled based on the probability and type of the crisis, and a real-time user location.

In some aspects, the user device may include a plurality of measurements units and/or sensors configured and/or programmed to measure a plurality of user parameters that may include biometric signals, movements, environmental characteristics, and other aspects. The measurement units may include an inertial measurement unit (IMU), a biometric sensor, a microphone, and/or the like. The measured user parameters may include, for example, inertial movement, biometric reading, audio data associated with a user's voice or surroundings, and/or the like.

The user device may calculate the probability of the crisis situation, based on the measurements recorded by the measurement units. Specifically, the user device may calculate the probability of the crisis situation when one or more measurements exceed their respective first predefined threshold values. In some aspects, the user device may calculate the probability based on the count/number of measurements that exceed their respective threshold values, and a magnitude of difference between the measurements and the threshold values. For example, the user device may calculate a probability of the user being held at gunpoint, based on inertial measurements that indicate a sudden movement of user's hands, and/or an increase in the reading of user's heart rate.

In some aspects, the user device may further determine the type of the crisis, when the calculated probability is greater than a second threshold value. The user device may determine the type of the crisis based on the user parameters measurements and a profile of the user. For example, the user device may determine that an elderly user may be having a heart attack, if the biometric readings indicate an increased heart rate, and the profile of the user indicates a medical history of heart related illness.

The user device may actuate one or more mitigation steps, based on the determined type and probability of the crisis, and a real-time user location. In some aspects, the user device may scale/customize the mitigation steps based on the probability and type of the crisis. For example, the user device may trigger a loud alarm and call caretakers that are near to the user, when the user falls down (e.g., when the user is old). On the other hand, the user device may call the police and call family members that are near to the user, when the user is held at gunpoint.

The present disclosure discloses a user device that provides customized assistance to a user in the time of crisis. Specifically, the user device customizes the assistance based on the type of the crisis, and hence the assistance is more beneficial and relevant to the user. Further, the user device provides the assistance based on a calculated probability of the crisis, and hence false alarms are considerably reduced. Furthermore, the user device assists the user even when the user is outdoors or in a remote area (far away from his family/friends).

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a user 102 who may be in a crisis situation. For instance, the user 102 may be held at a gun point 104*a*, in a medical emergency situation (such as falling down) 104*b*, in an assault situation 104*c*, drowning 104*d*, and/or the like. In these situations, the user 102 may be incapacitated or too scared to take any action to mitigate the crisis situation.

In some aspects, the user 102 may be carrying a user device 106. The user device 106 may be a wearable device, such as, a smart watch, a smart band, a smart bracelet, a smart ring, smart eyeglasses, a smart vest, and/or the like. The user device 106 may include a plurality of sensors (not shown in FIG. 1) that may be configured to monitor and measure a plurality of parameters associated with the user 102. For instance, the plurality of parameters may include, but is not limited to, biometric readings/measurements, user movements, user speech, sound of surroundings, and/or the like.

In some aspects, some or all of the plurality of user device sensors disposed on or with the user device 106 may continuously monitor the plurality of parameters of the user 102. Responsive to monitoring the parameters, the user device 106 may determine whether the user 102 is in the crisis situation and a type of the crisis. For instance, the user device 106 may determine whether the user 102 is held at gun point 104*a*, or the user 102 is in the medical emergency situation 104*b*.

In some aspects, the user device 106 may actuate one or more mitigation actions/steps based on the determined type of the crisis situation. The mitigation actions may include, for example, calling police 108, calling a caretaker (family/friends) 110, calling an ambulance 112 or a fire department 114; or triggering an alarm (not shown in FIG. 1) to notify people near to the user 102. The details of the user device 106 may be understood in conjunction with FIG. 2.

In one or more aspects, the user device 106 may be connected to a network 116 to perform the mitigation actions. The network 116 may be, for example, a communication infrastructure in which the connected devices discussed in various embodiments of this disclosure may communicate. The network may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

Figure 2:
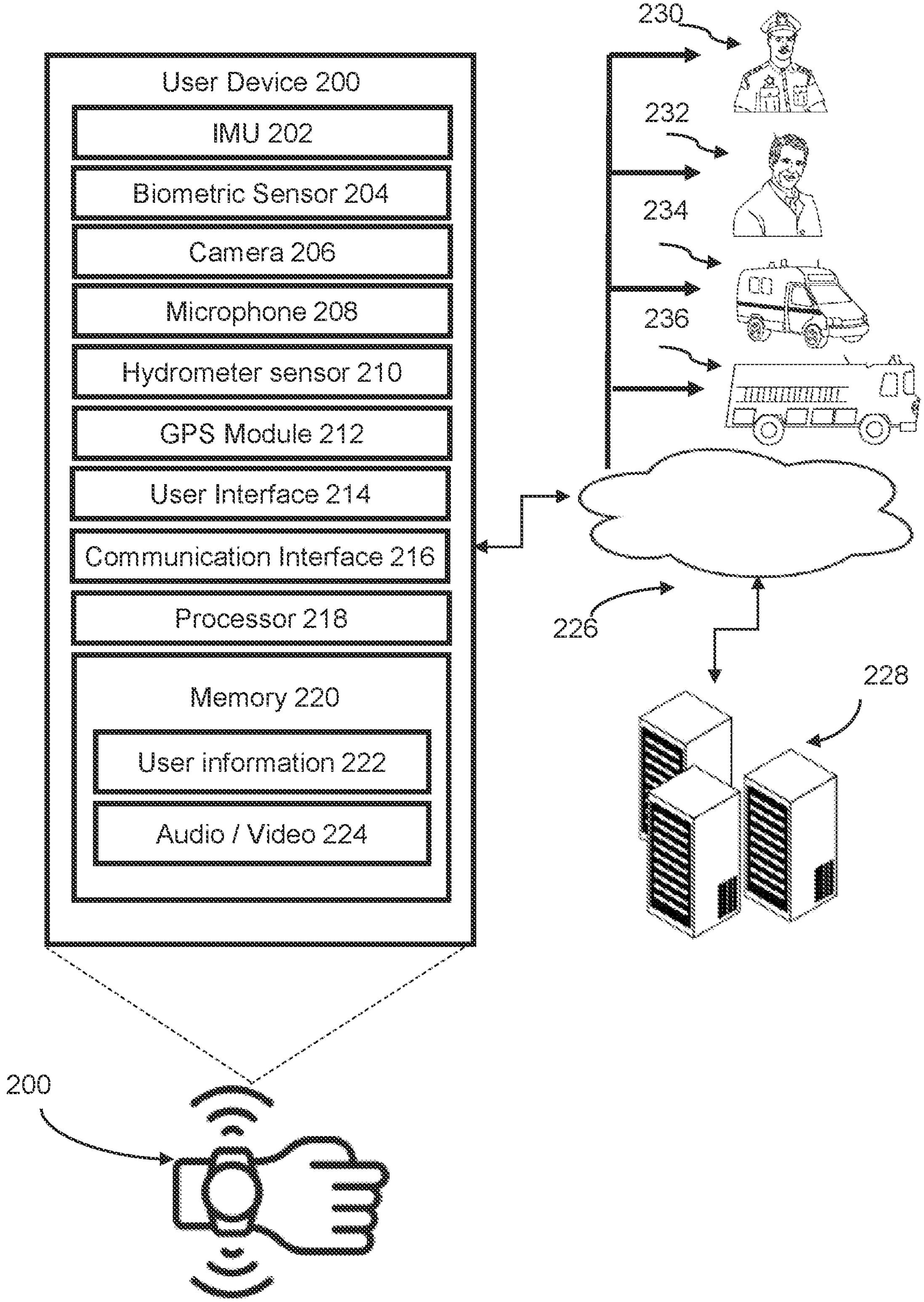
FIG. 2 depicts an example user device in accordance with the present disclosure.

FIG. 2 depicts an example user device 200 (same as the user device 106) in accordance with the present disclosure. The user device 200 may include a plurality of measurement units (or a measurement unit) configured to measure a plurality of parameters associated with the user 102. The plurality of measurement units may include an inertial measurement unit (IMU) 202, one or more biometric sensors 204 (or a biometric sensor 204), one or more cameras 206 (or a camera 206), a microphone 208, and a hydrometer sensor 210.

In accordance with one aspect of the present disclosure, any one or more of the plurality of measurement units may activate simultaneously and/or sequentially, and monitor the parameters of the user 102 either continuously or periodically according to a predetermined time increment.

In other aspects, the system may activate one or more of the plurality of measurement units based on one or more measurement unit(s) signals. For example, the IMU 202 may continuously or periodically monitor the movement of the user 102. The system may generate a baseline dataset indicative of routine movements for the user, which may include date information, time information, locality information, among other data metrics uniquely associated with the user. The system may store the baseline dataset to a persistent memory and compare data inputs indicative of sudden or other motions that indicate a high likelihood of a current crisis situation. The system may determine that one or more data inputs indicate a crisis situation by comparing a present motion with those identified as routine and ordinary. Additionally, the user device 200 may activate the camera 206 and/or a microphone 208 when the IMU 202 detects a movement, and the processor determines that the user movement exceeds a predetermined threshold or thresholds for movements considered to be ordinary or normal for that user. Such movements are considered herein as abnormal user movement. By evaluating user movements that are ordinary, and differentiating other movements as abnormal, the system may detect crisis situations while saving power consumption of the plurality of measurement units, as only the measurement units that are required to be activated, are activated (in a sequential or simultaneous manner), and the remaining measurement units stay in standby or sleep mode.

In some aspects, the IMU 202 may include, but is not limited to an accelerometer, a gyroscope, a magnetometer, and the like. The IMU 202 may be configured to detect a change in a position of the body of the user 102 with respect to time. In other words, the IMU 202 may be configured to detect sudden movements of the user 102 by evaluating velocity, acceleration, and by measuring gravitational "G" forces. For instance, when a criminal approaches the user 102 and asks the user 102 to raise his hands, the IMU 202 may capture the sudden movement of the user's hands. The sudden movement of the user's hands, when compared to the baseline dataset, may indicate that the user 102 is in a crisis situation. In other aspects, secondary factors may weight the sudden movement indicators more heavily when determining whether a particular movement is likely associated with the crisis situation. For example, the system may heavily weight (a scoring factor of 4/5, for example) a sudden hand movement if the system determines that the sudden movement is coterminous with a sudden elevation in heart rate, respiration rate, blood pressure, or other biometric data metrics.

In another aspect, the system may heavily weight sudden movements based on date information, time information, and/or localization information. For example, if the user is wearing the device at night and the system determines that the user is localized in a neighborhood known for high rates of crime, the system may assign a higher probability factory indicative of the crisis situation.

In another example, when the user's baseline dataset indicates that a low heart rate is typically associated with this user (e.g., a historic record indicates that a predetermined threshold of repeated events and respective biometric readings denotes a pattern for heart rate) given a particular time of day, the system may report a finding of the active crisis situation. For instance, if the user's baseline dataset indicates a historic lack of physical activity at a current time, then abnormally experiences spikes in elevated heart rate, the system may heavily rate these factors as indicative of the crisis situation, and more so when identified in conjunction with one or more other indicative factors discussed herein.

Similarly, the IMU 202 may be configured to detect inputs indicative of a crisis situation such as body movements of the user 102, for example, when the user 102 is abducted or is in other threating or distressing situations (such as assault, for example). For example, the system may determine that a rapid change in localization plus an elevated heart rate may indicate a carjacking situation. Likewise, the IMU 202 may be configured to detect sudden fall of the user 102 (for example, when the user 102 slips or falls from stairs).

In accordance with one or more aspects, the biometric sensor 204 may be configured to measure/monitor body vitals of the user 102, to determine if the user 102 is in a stressful crisis situation. Specifically, an increased measurement of the biometric sensor 204 may indicate an elevated nervous/anxiety state of the user 102. For instance, the biometric sensor 204 may monitor blood pressure, heart rate, body temperature, perspiration, respiration, and biochemical (cortisol or other detectable chemical indicators of distress) readings of the user 102.

In some aspects, the camera 206 may be configured to capture an image and/or video recording. The image/video recording may be associated with the user 102 and/or the surrounding of the user 102. For instance, in a scenario where the user 102 is in an assault situation, or when the user 102 is being held at gunpoint, the camera 206 may capture the video feed of the surrounding, to capture the details of the crisis situation. In cases where the user 102 is in a serious crisis situation, the user device 200 may transmit the video feed of the camera 206 to a server 228, via a network 226 (same as the network 116), in real-time to mitigate the crisis situation, or for record purposes. As an example, the video feed may capture the face of the assailant, if the user 102 is attacked.

In one or more aspects, the microphone 208 may be configured to capture sound of the environment of the user 102, such as a gunshot proximate to the user 102. In some aspects, the microphone 208 may also be configured to capture voice of the user 102. The user device 200 may be configured to determine whether the user 102 is in the crisis situation, based on the captured sound of the user environment and/or the user voice. For instance, when the user 102 screams "Help", then the microphone 208 may capture the user voice. On receipt of the voice, the user device 200 may determine whether the voice is of the user 102 (by comparing the captured voice with samples of user's voice stored in the user device 200 to recognize voice/speech of the user 102), and accordingly determine whether the user 102 is in the crisis situation.

In some aspects, the hydrometer sensor 210 may be configured to monitor whether the user device 200 (and correspondingly the user 102) is immersed in water. In other words, the hydrometer sensor 210 may be configured to determine whether the user 102 is drowning.

In accordance with some aspects of the present disclosure, the user device 200 may include a Global Positioning System (GPS) module 212 (or GPS receiver 212). The GPS module 212 may be configured to monitor a location of the user device 200 (and correspondingly the user 102) by using GPS. Specifically, the GPS module 212 may be configured to monitor the location of the crisis situation, so that the user device 200 may trigger mitigation actions accordingly.

The user device may further include a user interface 214 and a communication interface 216. The user interface 214 may be configured to take user's feedback on the crisis situation and/or to display notifications to the user 102. For example, the user 102 may press a panic button on the user interface 214 to indicate that the user 102 is in the crisis situation. The communication interface 216 may be configured to communicate with third parties, such as police 230, a caretaker 232, an ambulance 234, and a fire department 236, the server 228, and the like via the network 226. For example, the communication interface 216 may call the police 230 or the ambulance 234, when the user 102 presses the panic button on the user interface 214 or when the user device 200 determines that the user 102 is in a crisis situation (for example, when the user 102 is held at gunpoint). Similarly, the communication interface 216 may transmit the video feed of the incident that the camera 206 captures, to the server 228 for record purposes. In addition, the user interface 214 may display a notification, informing the user 102 that the police 230/the ambulance 234 has been called, in response to the user 102 pressing the panic button or when the user device 200 detects a crisis situation.

In accordance with one aspect of the present disclosure, instead of the communication interface 216 itself calling the police 230, as mentioned above, the communication interface 216 may cause activation of a mobile phone (not shown in FIG. 2) of the user 102, when the user 102 is in a crisis situation. In this case, the communication interface 216 may send an activation signal to the user mobile phone, via the network 226, to activate the mobile phone. Upon activation, the user mobile phone may call the police 230, or the ambulance 234.

In accordance with one or more aspects of the present disclosure, the user device 200 may include one or more processors 218 (or a processor 218), and a computer-readable memory 220. In some aspects, the measurement units, the GPS module 212, the user interface 214, the communication interface 216, the processor 218, and the memory 220 communicatively couple with each other via a bus (not shown in FIG. 2).

The user device 200 may utilize the memory 220 to store programs in code and/or to store data for performing various crisis management operations in accordance with the disclosure. The memory 220 may be a non-transitory computer-readable memory. The processor(s) 218 may be configured and/or programmed to execute computer-executable instructions stored in the memory 220 for performing various functions of the user device 200, as well as for managing crisis situation in accordance with the disclosure. Consequently, the memory 220 may be used for storing code and/or data code and/or data for performing operations in accordance with the disclosure.

The processor 218 may be disposed in communication with one or more memory devices (e.g., the memory 220 and/or one or more external databases not shown in FIG. 2). The memory 220 may include any one or a combination of volatile memory elements (e.g., dynamic random access memory (DRAM), synchronous dynamic random access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.

As mentioned earlier, the memory 220 may be one example of a non-transitory computer-readable medium, and may be used to store programs in code and/or to store data for performing various operations in accordance with the disclosure. The instructions in the memory 220 can include one or more separate programs, each of which can include an ordered listing of computer-executable instructions for implementing logical functions.

Furthermore, the memory 220 may store user information 222 in accordance with an embodiment of the present disclosure. Specifically, the user information 222 may include a profile of the user 102. In some aspects, the user profile may include name, age, medical history, contact details of the family members and friends of the user 102, contact details of medical resources (such as doctor, nurse, and/or the like) associated with the user 102, a list of predefined emergency numbers added by the user 102, and/or the like. In addition, the user information 222 may include daily routine of the user 102. Specifically, the user information 222 may include routine movement of the user 102. For example, the user information 222 may include information indicating that the user 102 exercises every day from 6 to 7 AM, goes for swimming every evening at 7 PM, and/or the like.

In some aspects, the user device 200 may determine and store a first pre-defined threshold values for each of the measurement units, based on the daily routine of the user 102. For example, if the user 102 exercises every morning at 7 AM for one hour, the user device 200 may measure inertial and/or biometric readings of the user 102 during this time, by using the IMU 202 and the biometric sensor 204. The user device 200 may then store the measured readings in the user information 222, as pre-defined threshold values corresponding to the IMU 202 and the biometric sensor 204, for the time period of 7-8 AM every morning. This way, the user device 200 will "know" that the user 102 may have elevated body movement and/or biometric readings during the time window of 7-8 AM every morning, and the elevated measurements during this time are not to be construed as a crisis situation.

In a similar manner, each of the measurement units may measure their respective readings based on the daily routine of the user 102, and may store respective pre-defined threshold values in the user information 222.

A person ordinarily skilled in the art may appreciate that the pre-defined threshold values for each measurement unit may vary with the time of the day, specifically based on the daily routine of the user 102. For example, a threshold value for heart rate may be 140 beats per minute (bpm) between 7-8 AM (when the user 102 exercises), and may be 50 bpm between 11 PM-5 AM (when the user 102 sleeps).

In an aspect of the present disclosure, the user device 200 may determine that the user 102 may be in a crisis situation if any of the measured readings are greater than the respective threshold values (for that time of the day).

In some aspects, the user information 122 may additionally store samples of the voice of the user 102. For example, the user 102 may store his voice samples at the time of registration of the user device 200.

In accordance with one or more aspects, the memory 220 may further include an audio/video module 224 that stores the image/video recording captured by the camera 206 in a crisis situation. In some aspects, the communication interface 216 may fetch the stored image/video recording from the audio/video module 224, and transmit it to the server 228 for performing mitigation actions.

In accordance with one or more aspects, the processor 218 may be configured to receive (or obtain) the plurality of parameters (or plurality of measurements) from the measurement units described above. In particular, the processor 218 may be configured to receive the plurality of measurements as and when the measurement units measure their respective signals. In addition, the processor 218 may be configured to receive/obtain the pre-defined threshold values of each of the plurality of parameters from the memory 220 (from the user information 222).

In some aspects, one or more measurement units may continuously monitor the activity of the user 102, and other measurement unit may be in sleep mode. When the processor 218 obtains the signals associated with the crisis situation from the one or more measurement units, the processor 218 may actuate the other measurement units to obtain measurements from the other measurement units. For example, when the processor 218 obtains measurements from one or more measurement units (such as IMU 202 and the biometric sensor 204) that indicate a crisis situation, the processor 218 may activate other measurement units, for example, the camera 206, the microphone 208, the hydrometer sensor 210, etc., to obtain measurements from the other measurement units.

In some aspects, the processor 218 may be configured to determine whether one or more of the obtained plurality of measurements exceed their respective pre-defined threshold values. In particular, the processor 218 may compare the plurality of measurements with their respective pre-defined threshold values, and calculate a difference between the plurality of measurements and their respective pre-defined threshold values.

For instance, the processor 218 may obtain the measurements from the IMU 202 and the biometric sensor 204 during morning hours. After obtaining the measurements, the processor 218 may compare the measurements of the IMU 202 and the biometric sensor 204 with their stored pre-defined threshold values for the morning hours. In particular, if the processor 218 obtains the measurements during morning workout (around 7 am) of the user 102, then the processor 218 obtains the respective pre-defined threshold values corresponding to the time of 7 am. Thereafter, the processor 218 may perform the comparison and the calculation of the difference between the measured values and the predefined threshold values.

In some aspects, the processor 218 may be configured to calculate a probability that the user 102 is in the crisis situation, based on the determination that one or more measurements exceed their respective pre-defined threshold values. In one or more aspects, the calculated probability may be based on the count of measurements (or parameters) that exceeds their respective pre-defined threshold values. In addition, the probability may be based on magnitude of difference between the plurality of measurements and their respective pre-defined threshold values.

For instance, as discussed above, the processor 218 may determine whether the user 102 is in the crisis situation, when the processor 218 obtains the measurements from the IMU 202 and the biometric sensor 204. In particular, the processor 218 may determine the difference between the strength of the detected inertial signal (or the rate of change of position of the user's hand) and the signals from the biometric sensor 204 with their respective pre-defined threshold value. If the difference between the inertial signals and respective pre-defined threshold value is less, and the difference between the signals from the biometric sensor 204 and respective pre-defined threshold value is also less, the processor 218 may calculate low probability of the crisis situation (such as 20%). In scenarios where the difference between the inertial signals and respective pre-defined threshold value is more, and the difference between the signals from the biometric sensor 204 and respective pre-defined threshold value is also more, the processor 218 may calculate high probability of the crisis situation (such as 65%).

In another scenario, when the IMU 202 transmits a signal indicating abnormal hand movement from the IMU 202, and the biometric sensor 204 transmits a signal indicating a high heart rate and perspiration, the processor 218 may actuate and receive signals from all the other measurement units. Thereafter, the processor 218 may determine whether the user 102 is in the crisis situation. In particular, the processor 218 may calculate the count/number of signals indicating the crisis situation. For example, the processor 218 may calculate a high probability of the crisis situation (such as greater than 85%), when all the four measurement units (the IMU 202, the biometric sensor 204, the microphone 208, the hydrometer sensor 210) indicate the crisis situation. However, the processor 218 may calculate a low probability of the crisis situation (such as 65%), when only one measurement unit (e.g., the IMU 202) indicates the crisis situation.

As mentioned above, the probability may be further based on the magnitude of the difference between the plurality of measurements and their respective pre-defined threshold values. For instance, when the microphone 208 captures a noise whose decibel value is significantly greater than a predefined decibel threshold (e.g., in the case of a gunshot), the processor 218 may calculate a high probability (e.g., more than 85%) of the crisis situation. On the other hand, the processor 218 may calculate a low probability (e.g., less than 50%) if the captured noise is only marginally higher than the predefined decibel threshold.

In the former case of the gunshot, as mentioned above, even if the measurements from other measurement units are not greater than their respective pre-defined thresholds, the processor 218 may calculate a high probability of the crisis situation, since the magnitude of the decibel level of the captured noise is significantly higher than the pre-defined decide threshold value.

In accordance with one or more aspects of the present disclosure, the processor 218 may determine a type of the crisis situation, responsive to a determination that the crisis probability is greater than a threshold (e.g., 60% or more). In other words, the processor 218 may determine whether the user 102 is in a medical emergency (e.g., fallen down or having a heart attack), or the user 102 is held at gunpoint or in assault situation, and/or the like.

In some aspects, the processor 218 may determine the type of crisis situation based on the measurements obtained by the processor 218 and the profile of the user 102. In one or more aspects, the determination of the type of the crisis situation may be based on the medical history of the user 102 (stored in the user information 222). For instance, the processor 218 may determine that the user 102 is in medical emergency, if the user 102 is a heart patient (identified based on the user's medical history), and the biometric measurement using the biometric sensor 204 indicates an increase in the heart rate above the pre-defined threshold value.

Similarly, the processor 218 may determine that the user 102 is in medical emergency (e.g., the user 102 has fallen down) when the processor 218 determines sudden body movement (captured via the IMU 202). Likewise, the processor 218 may determine that the user 102 is in assault situation, when the processor 218 receives a signal from a microphone 208 whose decibel level is substantially greater than the pre-defined decibel threshold value.

In accordance with one or more aspects, the processor 218 may actuate one or more mitigation steps based on the probability of the crisis situation, the type of the crisis situation, the user information 222, and the location of the user 102 (as captured by the GPS module 212). The mitigation steps may include, but are not limited to, triggering an alarm above a predefined decibel level for a predetermined time period to indicate the crisis situation, automatically calling emergency numbers (such as the police 230, the ambulance 234, the fire department 236, the caretaker 232, etc.), recording audio and/or video, and the like.

In some aspects, the processor 218 may select the most appropriate mitigation step(s) based on the probability and, type of the crisis situation, the user information 222, and the location of the user 102. Furthermore, the processor 218 may scale the level of mitigation steps based on the probability and type of the crisis situation, and the user information 222.

For instance, the processor 218 may trigger a call to the ambulance 234 and/or the caretaker 232, and may not call the police 230 or the fire department 236, when the processor 218 determines that the user 102 is in medical emergency. Likewise, the processor 218 may actuate a first alarm (at a preset decibel level) for a predetermined time period (such as 30 seconds at 130 dB, and then stops) to grab attention of nearby people, if the processor 218 determines that the user 102 is drowning (via the hydrometer sensor 210). In this example, the processor 218 may again obtain the signal from the hydrometer sensor 210 after the predetermined time period, to determine if there is a change in the state of the user 102. The processor 218 may trigger a second alarm (may be for a longer period of time, and at a higher decibel level) in case the processor 218 determines that the state of the user 102 is the same or has worsened. Alternatively, the processor 218 may trigger a call to the ambulance 234, the fire department 236, and/or to the caretaker 232, to indicate the crisis situation of the user 102, after triggering the alarm.

In accordance with one or more aspects of the present disclosure, the processor 218 may actuate the one or more mitigation steps based on the profile of the user 102. For instance, if the user 102 is an elderly user and the IMU 202 captures a sudden body movement (e.g., captures an inertial signal greater than the first pre-defined threshold), the processor 218 may determine that the user 102 may be in a medical emergency (e.g., the elderly user may have fallen down), and may accordingly actuate the mitigations steps. The mitigation steps, in this case, may include triggering a loud alarm to alert people near to the user 102, and/or calling the ambulance 234/the caretaker 232, via the communication interface 216.

In some aspects, the processor 218 may transmit the location of the user 102, determined via the GPS module 212, to the ambulance 234, the caretaker 232, the police 230 and/or the fire department 236, when the processor 218 calls one or more of these entities. In one aspect, the processor transmits the location of the user 102 via the communication interface 216.

In accordance with the further aspects of the present disclosure, the processor 218 may actuate the mitigation steps based on the location of the user 102. Specifically, the processor 218 may receive the current location of the user 102 from the GPS module 212 and perform the mitigation steps based on the received location. For instance, the user information 222 may include a list of predefined emergency numbers (contact persons or caretakers) added by the user 102, during the registration of the user device 200. When the user 102 is in the crisis situation, the processor 218 may determine the location of the user 102, and may receive location information of each of the contact persons. In this case, the processor may receive the location information of each of the contact persons from the server 228, or one or more separate servers (not shown in FIG. 2) that tracks locations of a plurality of users.

Responsive to a determination of the location of the contact persons, the processor 218 may select those contact persons who are nearest to the user 102, and may trigger a call to the selected contact persons. In addition, the processor 218 may transmit the geo-location of the user 102 to the one or more contact persons, via the communication interface 216.

In accordance with further embodiments of the present disclosure, the processor 218 may transmit an indication to the user 102 that the user device 200 has actuated the mitigation steps, when the processor 218 actuates the one or more mitigation steps. In some aspects, the processor 218 may provide the indication in any form, such as a haptic feedback, display the actuated mitigation steps on the user interface 214, turn on a flashlight (not shown in FIG. 2) of the user device 200, and/or the like. For instance, the processor 218 may display “Calling Police” on the user interface 214, when the processor 218 determines that the user 102 is at gunpoint.

In accordance with further embodiments of the present disclosure, the processor 218 may receive one or more feedbacks from the user 102, responsive to the actuation of the one or more mitigation steps. For instance, the user 102 may provide manual inputs to stop the mitigation steps, when the user 102 receives the indication that the user device 200 (or the processor 218) has actuated the one or more mitigation steps. In this case, the user 102 may believe that he is not in the crisis situation, and hence may want to stop the mitigation steps. In some aspects, the processor 218 may first provide the indication to the user 102, and then wait for a predetermined time period (for example, for 5 seconds) to receive user’s feedback. If the user 102 does not provide any feedback in the predetermined time period, then the processor 218 may perform the required one or more mitigation steps.

In accordance with one or more aspects of the present disclosure, the user device 200 may provide a provision to the user 102 to disable the user device 200 (or one or more measurement units) for a predetermined time. For instance, if the user 102 is going out for a workout, which is outside the daily routine of the user 102, the user 102 may disable the user device 200 to prevent trigger of a false alarm.

In some aspects, the processor 218 may actuate the one or more mitigation steps when the user 102 presses a panic button (or any emergency button) on the user interface 214 (or any other place). In such scenarios, the processor 218 may actuate the mitigation steps immediately, and may not wait for signals/measurements from the measurement units(s).

Figure 3:
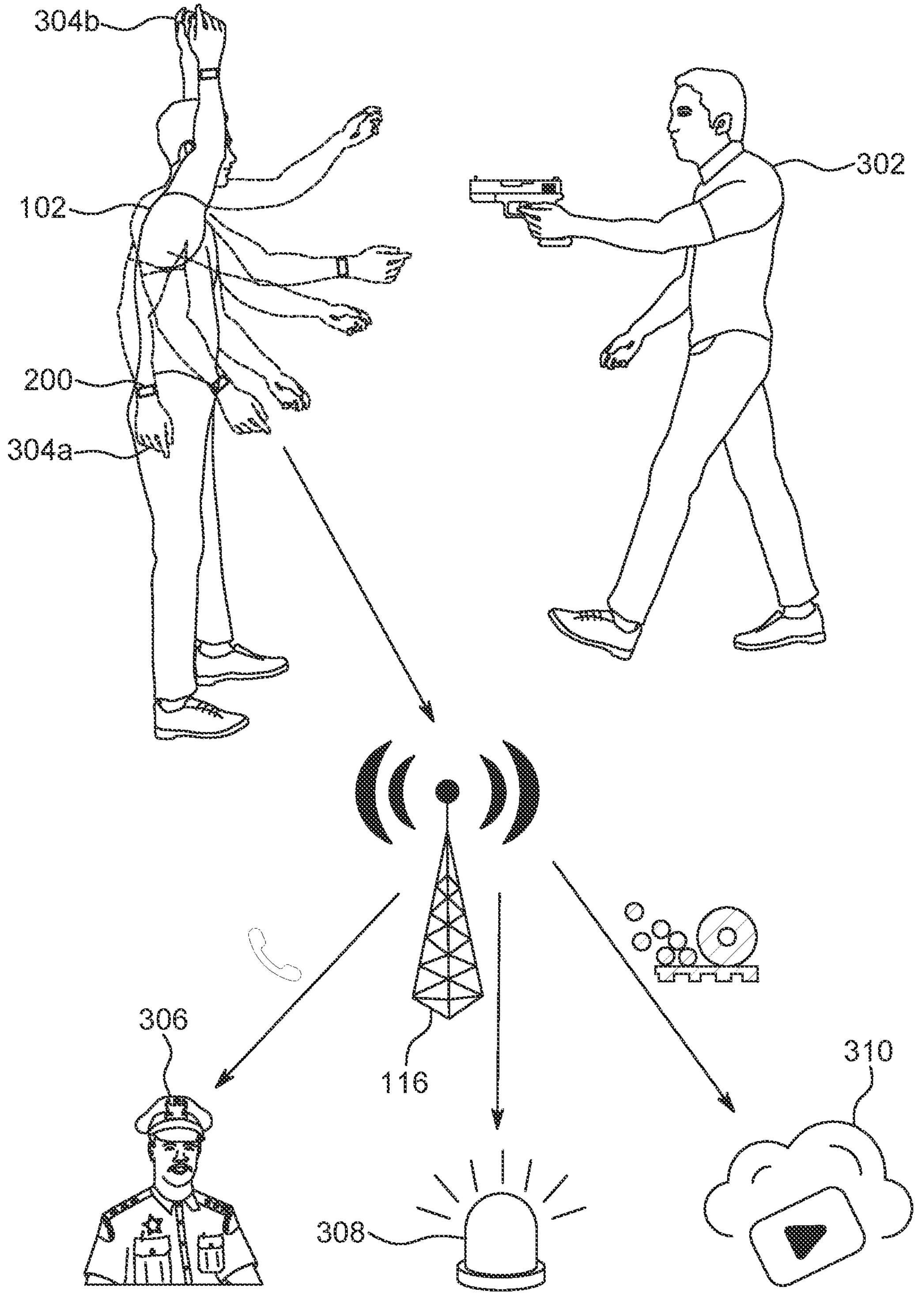
FIG. 3 illustrates an example embodiment to manage a crisis situation in accordance with the present disclosure.

FIG. 3 illustrates an example embodiment to manage a crisis situation in accordance with the present disclosure. In the embodiment shown in FIG. 3, the user 102 may be walking on a road (with his user device 200), when suddenly a person 302 may approach the user 102 with a gun in his hand. The person 302 may ask the user 102 to raise his hands, and the user 102 may move his hands up suddenly. Since this is an unusual situation, the user 102 might be nervous, and consequently his heart rate may increase, he may start to sweat, and/or his blood pressure may shoot up. The user device 200 may monitor all these changes.

In particular, the IMU 202 may monitor the sudden movement of the hand from a position 304*a* to a position 304*b* (e.g., the IMU 202 may detect that the rate of change of positions of the hand is greater the pre-defined threshold value). The processor 218 may then compare the detected movement signal with the pre-defined threshold value, to determine if the sudden movement is routine movement of the user 102 or if it is an abnormal movement.

Further, the biometric sensor 204 may monitor biometric changes in the user body, such as nervousness, heart rate, sweating, and/or the like. The detection of the signals by the biometric sensor 204 increases the probability that the user 102 may be in a crisis situation. In addition, the processor 218 may use signals from other measurement units, such as the microphone 208, to increase the probability (reliability) of the crisis situation.

The processor 218 may determine the type of the crisis situation (in this case, the user 102 being held at gunpoint) by correlating the signals from various measurement units, when the probability of the crisis situation is greater than a threshold. Upon determination of the type of the crisis, the processor 218 may actuate one or more mitigation steps based on the type of crisis situation and the probability. Specifically, in the embodiment shown in FIG. 3, the processor 218 may determine that the user 102 is held at gunpoint, and the processor 218 may actuate one or more mitigation steps accordingly. In some aspects, the processor 218 may actuate the one or more mitigation steps simultaneously or in a sequential manner.

For instance, in the embodiment of FIG. 3, the processor 218 may trigger an automated call to police 306, trigger an alarm 308, and/or record the video/audio using the camera 206/microphone 208 and transmit the recording to the server 228 (to increase the reliability and help in the investigation of the matter). In some aspects, the processor 218 may first trigger the automated call to the police 306 and trigger the alarm 308, and then transmit the recording 310 to the server 228 when the situation is more serious or when the situation persists beyond a preset time period. In some aspects, the processor 218 may be configured to actuate the mitigation steps via the network 116.

Figure 4:
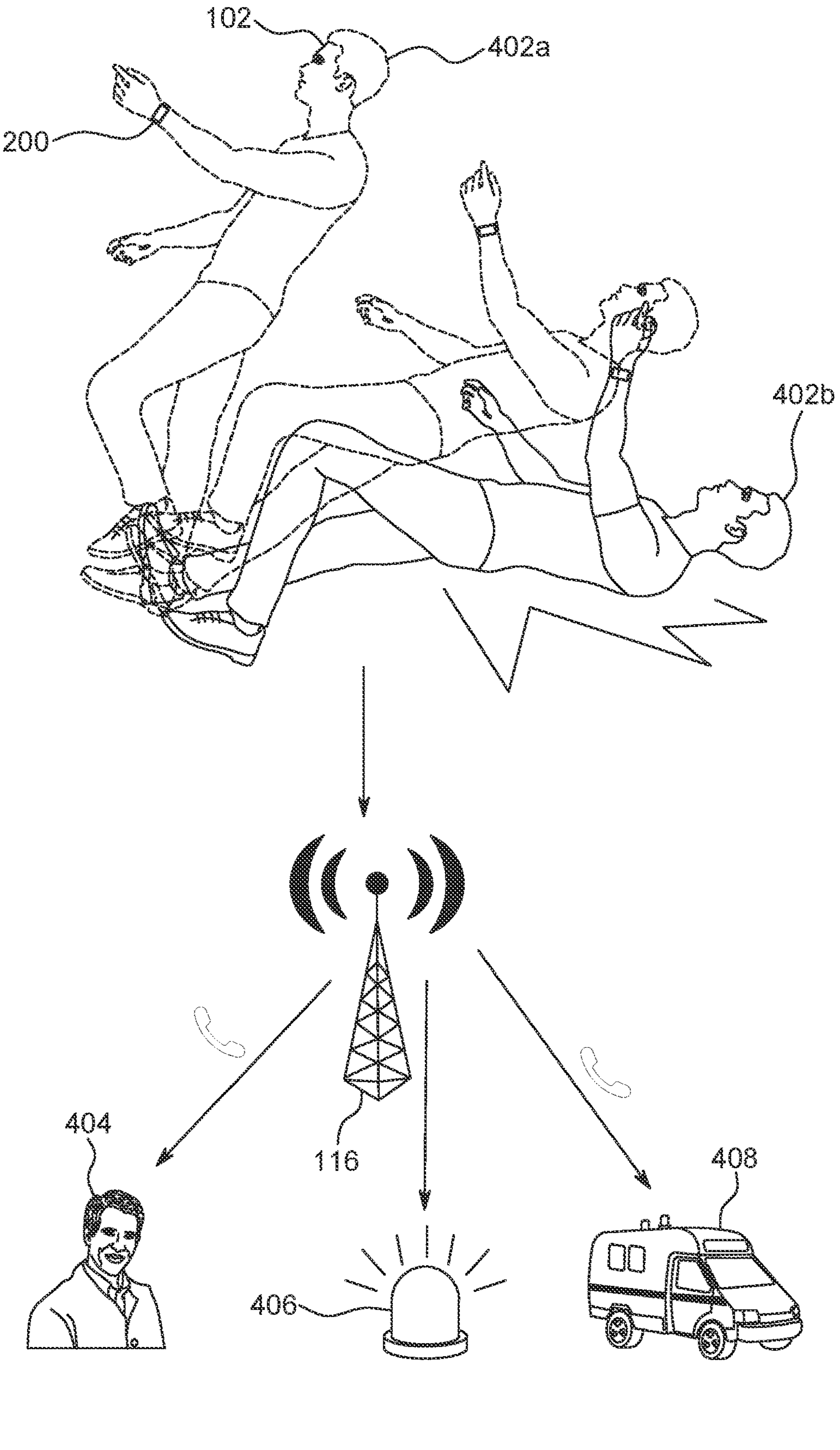
FIG. 4 illustrates another example embodiment to manage a crisis situation in accordance with the present disclosure.

FIG. 4 illustrates another example embodiment to manage a crisis situation in accordance with the present disclosure. As discussed above, the memory 220 may store user information 222 that may include profile of the user 102, such as age, medical history, etc. In the embodiment shown in FIG. 4, the user 102 (e.g., an elderly user) may be walking, and may suddenly fall. The IMU 202 of the user device 200 may monitor the sudden movement of the user’s body from position 402*a* to 402*b*. Based on the user’s profile (age and daily routine) and the signals from the IMU 202, the processor 218 may determine that the user 102 has fallen (type of crisis situation).

Further, the processor 218 may obtain additional measurements from the other measurement units (such as the microphone 208, the biometric sensor 204, etc.) to determine the reliability of determination of the crisis situation. On receipt of the measurements, the processor 218 may compare the received measurements with the respective pre-defined threshold values, to determine if the sudden movement is a routine movement of the user 102, or if it is an abnormal movement.

The processor 218 may determine that the user 102 has fallen (based on the measurements from the IMU 202, age, daily routine, and other measurements), when the processor 218 determines that the probability of the crisis situation is greater than a predefined threshold value. The processor 218 may then actuate one or more mitigation steps, based on the type and probability of the crisis situation. For instance, the processor 218 may trigger an automated call to a caretaker 404, trigger an alarm 406, and/or trigger an automated call to an ambulance 408.

Figure 5:
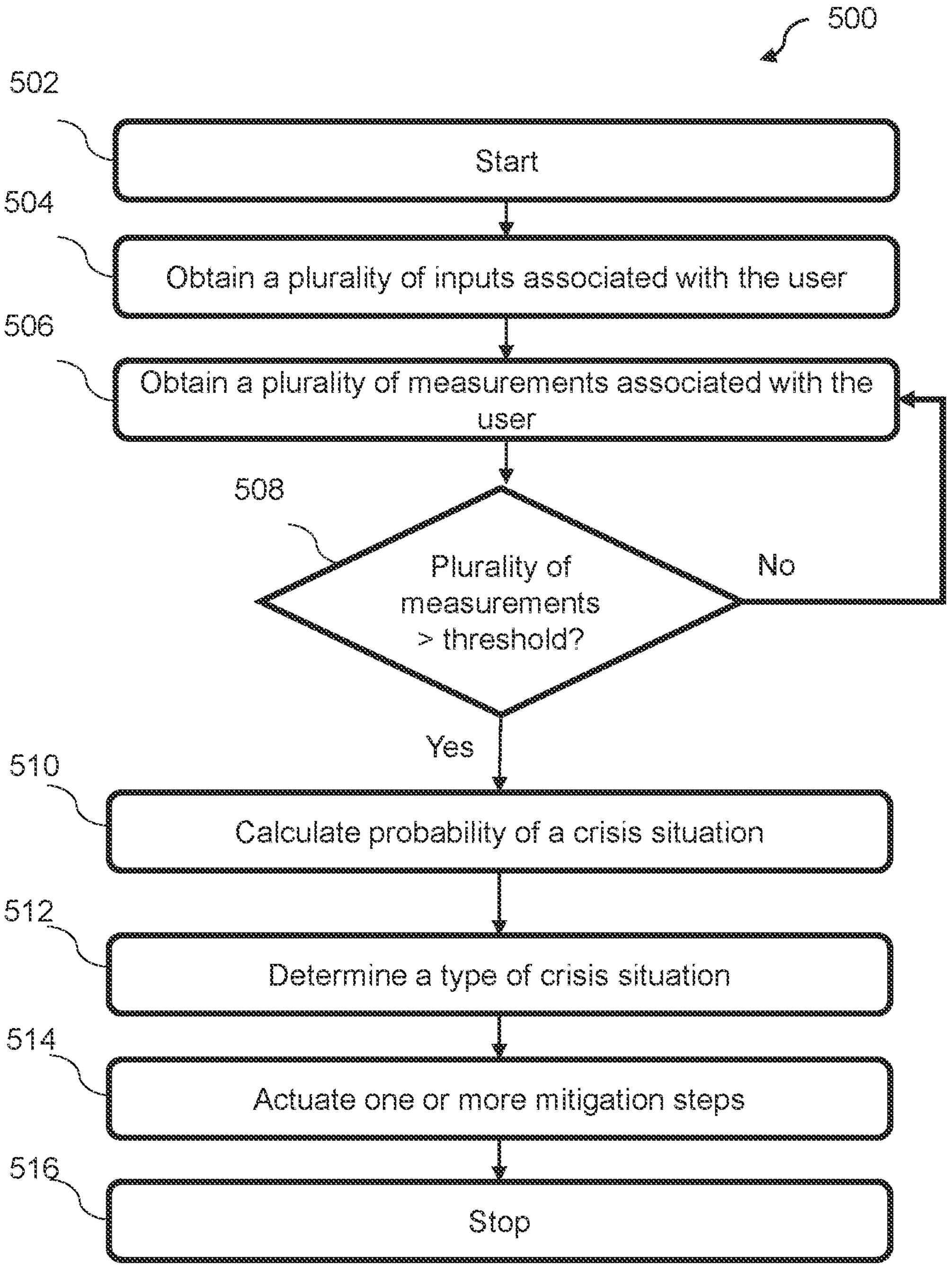
FIG. 5 depicts a flow diagram of an example method for managing a crisis situation in accordance with the present disclosure.

FIG. 5 depicts a flow diagram of an example method 500 for managing a crisis situation in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. At step 504, the method may include obtaining, via the processor 218 of the user device 200, a plurality of inputs associated with the user 102. The plurality of inputs may include a profile of the user 102 and a real-time location of the user 102. The profile may include name, age, medical history, contact details of the user's family members and friends, contact details of medical resources (such as doctor) associated with the user 102, a list of predefined emergency numbers inputted by the user 102, daily routine of the user 102 etc.

At step 506, the method 500 may include obtaining, via the processor 218, a plurality of measurements associated with the user 102 from one or more measurement unit(s). The measurement unit(s) may include the IMU 202, the biometric sensor 204, the camera 206, the microphone 208, the hydrometer sensor 210, and the like.

At step 508, the method 500 may include determining, via the processor 218, whether the plurality of measurements exceed their respective first pre-defined threshold values. When the processor 218 determines that none of the measurements exceeds the first pre-defined threshold values, the method 500 moves back to the step 506 to obtain the plurality of measurements again. As discussed above, all the measurement units may be actuated simultaneously, or the measurement units may be actuated in a sequential manner (to conserve power in the user device 200).

In a scenario where one or more measurements exceed their respective first pre-defined threshold values, the method 500 moves to step 510. At step 510, the method 500 may include calculating, via the processor 218, a probability that the user 102 is in a crisis situation. In some aspects, the calculation of the probability is based on a count of the one or more measurements, and a magnitude of difference between the one or more measurements and the respective pre-defined threshold values. The details of the calculation of the probability are already discussed above.

Next, at step 512, the method 500 may include determining, via the processor 218, a type of the crisis situation based on the one or more measurements and the profile of the user 102. In particular, the processor 218 may determine the type of the crisis situation when the probability is greater than a second pre-defined threshold value. In some aspects, the first pre-defined threshold values may be different from the second pre-defined threshold value. The types of the crisis situation are already discussed above.

Based on the determination of the type and probability of crisis situation, the method 500 may include actuating, via the processor 218, one or more mitigation steps at step 514. In some aspects, the one or more mitigation steps may be actuated based on the probability and the type of the crisis situation, and the real-time location of the user 102. The details of the one or more mitigation steps may be understood in conjunction with above-mentioned details. The method 500 stops at step 516.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to manage a crisis situation of a user, the method comprising:

obtaining, via a processor of a user device, a profile of the user and a real-time location of the user;

obtaining, via the processor, a plurality of measurements associated with the user from a plurality of measurement units of the user device, wherein the plurality of measurements comprises an inertial measurement indicative of a sudden movement of the user, one or more biometric readings of the user, and one or more additional measurements associated with the user;

determining, via the processor, whether one or more of the plurality of measurements exceed respective first predefined threshold values;

calculating, via the processor, a probability of the crisis situation when the one or more measurements exceed the respective first predefined threshold values, wherein the calculation of the probability is based on a count of the one or more measurements, and a magnitude of difference between the one or more measurements and the respective first predefined threshold values;

responsive to calculating the probability, selecting, via the processor, a type of the crisis situation based on the one or more measurements and the profile of the user, when the probability is greater than a second predefined threshold value, wherein selecting the type of the crisis situation comprises selecting crises situation from: detecting a fall of the user, detecting an assault situation, detecting whether the user is held at a gunpoint, detecting whether the user is drowning, and detecting a medical emergency; and actuating, via the processor, one or more mitigation steps based on the probability, the type of the crisis situation, and the real-time location of the user, wherein actuating the one or more mitigation steps comprises:

actuating a first mitigation step when the processor selects a first type of crises situation, actuating a second mitigation step when the processor selects a second type of crises situation, and wherein the first type of crises situation is different from the second type of crises situation.

2. The method of claim 1, wherein the one or more biometric readings comprise blood pressure, heart rate, body temperature, perspiration, respiration, and biochemical readings.

3. The method of claim 1, wherein actuating the one or more mitigation steps comprises triggering an alarm for a predetermined time period to indicate the crisis situation, automatically calling one or more emergency numbers, transmitting the real-time location of the user to one or more emergency contacts, recording an audio and/or a video, and transmitting the recorded audio and/or video to a server.

4. The method of claim 1, wherein the profile of the user comprises an age, a medical history, and a daily routine of the user.

5. The method of claim 1 further comprising obtaining the plurality of measurements in a sequential manner.

6. The method of claim 1 further comprising displaying an indication associated with the actuation of the one or more mitigation steps on a user interface of the user device.

7. The method of claim 1, wherein the one or more additional measurements comprise measurements associated with drowning of the user in water.

8. The method of claim 1, wherein the one or more additional measurements comprise one or more of: a sound measurement of surrounding of the user, and a speech of the user.

9. The method of claim 1, wherein the first type of crises situation comprises medical emergency and the second type of crises situation comprises non-medical emergency.

10. A user device configured to manage a crisis situation of a user, the user device comprising:

a plurality of measurement units that are configured to measure a plurality of measurements associated with the user, wherein the plurality of measurements comprises an inertial measurement indicative of a sudden movement of the user, one or more biometric readings of the user, and one or more additional measurements associated with the user;

a processor communicatively coupled to the plurality of measurement units; and a memory for storing executable instructions, the processor configured to execute the instructions to:

obtain a profile of the user and a real-time location of the user;

obtain the plurality of measurements from the plurality of measurement units;

determine whether one or more of the plurality of measurements exceed respective first predefined threshold values;

calculate a probability of the crisis situation when the one or more measurements exceed the respective first predefined threshold values, wherein the calculation of the probability is based on a count of the one or more measurements, and a magnitude of difference between the one or more measurements and the respective first predefined threshold values;

responsive to the calculation of the probability, select a type of the crisis situation based on the one or more measurements and the profile of the user, when the probability is greater than a second predefined threshold value, wherein the selection of the type of the crisis situation comprises selecting crises situation from: detecting a fall of the user, detecting an assault situation, detecting whether the user is held at a gunpoint, detecting whether the user is drowning, and detecting a medical emergency; and actuate one or more mitigation steps based on the probability, the type of the crisis situation, and the real-time location of the user, wherein the actuation of the one or more mitigation steps comprises:

actuating a first mitigation step when the processor selects a first type of crises situation, actuating a second mitigation step when the processor selects a second type of crises situation, and wherein the first type of crises situation is different from the second type of crises situation.

11. The user device of claim 10, wherein the processor obtains the profile of the user from the memory.

12. The user device of claim 10, wherein the processor obtains the real-time location of the user from a Global Positioning System (GPS) receiver.

13. The user device of claim 10, wherein the one or more biometric readings comprise blood pressure, heart rate, body temperature, perspiration, respiration, and biochemical readings.

14. The user device of claim 10, wherein the one or more mitigation steps comprise triggering an alarm for a predetermined time period to indicate the crisis situation, automatically calling one or more emergency numbers, transmitting the real-time location of the user to one or more emergency contacts, recording an audio and/or a video, and transmitting the recorded audio and/or video to a server.

15. The user device of claim 10, wherein the profile of the user comprises an age, a medical history, and a daily routine of the user.

16. The user device of claim 10, wherein the processor is further configured to obtain the plurality of measurements in a sequential manner.

17. The user device of claim 10, wherein the processor is further configured to execute the instructions to display an indication associated with the actuation of the one or more mitigation steps on a user interface of the user device.

18. The user device of claim 10, wherein the one or more additional measurements comprise measurements associated with drowning of the user in water.

19. The user device of claim 10, wherein the one or more additional measurements comprises one or more of: a sound measurement of surrounding of the user, a speech of the user.

20. A non-transitory computer-readable storage medium having instructions stored thereupon which, when executed by a processor, cause the processor to:

obtain a profile of a user and a real-time location of the user;

obtain, via a plurality of measurement units, a plurality of measurements associated with the user, wherein the plurality of measurements comprises an inertial measurement indicative of a sudden movement of the user, one or more biometric readings of the user, and one or more additional measurements associated with the user;

determine whether one or more of the plurality of measurements exceed respective first predefined threshold values;

calculate a probability of a crisis situation when the one or more measurements exceed respective the respective first predefined threshold values, wherein the calculation of the probability is based on a count of the one or more measurements, and a magnitude of difference between the one or more measurements and the respective first predefined threshold values;

responsive to calculating the probability, select a type of the crisis situation based on the one or more measurements and the profile of the user, when the probability is greater than a second predefined threshold value, wherein the selection of the type of the crisis situation comprises selecting crises situation from: detecting a fall of the user, detecting an assault situation, detecting whether the user is held at a gunpoint, detecting whether the user is drowning, and detecting a medical emergency; and actuate one or more mitigation steps based on the probability, the type of the crisis situation, and the real-time location of the user, wherein the actuation of the one or more mitigation steps comprises:

actuating a first mitigation step when the processor selects a first type of crises situation, actuating a second mitigation step when the processor selects a second type of crises situation, and wherein the first type of crises situation is different from the second type of crises situation.

* * * * *